United States Patent [19]
Mortimer et al.

[11] Patent Number: 6,099,087
[45] Date of Patent: Aug. 8, 2000

[54] HYDRAULIC BRAKING SYSTEMS FOR VEHICLES

[75] Inventors: Ivan Mortimer, West Midlands, United Kingdom; Helmut Heibel, Moschheim, Germany

[73] Assignee: Lucas Industries public limited company, United Kingdom

[21] Appl. No.: 08/860,744

[22] PCT Filed: Dec. 15, 1995

[86] PCT No.: PCT/GB95/02940

§ 371 Date: Mar. 18, 1999

§ 102(e) Date: Mar. 18, 1999

[87] PCT Pub. No.: WO96/18531

PCT Pub. Date: Jun. 20, 1996

[30] Foreign Application Priority Data

Dec. 15, 1995 [GB] United Kingdom .................... 9425457

[51] Int. Cl.[7] ...................................................... B60T 8/42
[52] U.S. Cl. ............................... 303/115.2; 303/115.1; 303/115.4; 303/113.4; 303/113.2
[58] Field of Search ........................... 303/116.1, 116.2, 303/139, 140, 116.4, 115.1, 115.4, 113.4, 113.2, 115.2

[56] References Cited

U.S. PATENT DOCUMENTS

| | | | |
|---|---|---|---|
| 4,756,391 | 7/1988 | Agarwal et al. | |
| 4,790,608 | 12/1988 | Burgdorf et al. | 303/114 |
| 4,812,777 | 3/1989 | Shirai. | |
| 4,824,188 | 4/1989 | Hatch | 303/115.4 |
| 5,013,096 | 5/1991 | Ocvirk et al. | 303/116.1 |
| 5,039,175 | 8/1991 | Holzmann et al. | 303/122.01 |
| 5,246,283 | 9/1993 | Shaw et al. | 303/115.2 |
| 5,383,719 | 1/1995 | Farr | 303/113.2 |
| 5,383,720 | 1/1995 | Schmidt | 303/113.5 |

FOREIGN PATENT DOCUMENTS

| | | |
|---|---|---|
| 395262 | 10/1990 | European Pat. Off. . |
| 439729 | 8/1991 | European Pat. Off. . |
| 2509243 | 1/1983 | France . |
| 3424912 | 1/1986 | Germany . |
| 4208581 | 5/1993 | Germany . |
| 4327206 | 2/1995 | Germany . |
| 2100816 | 1/1983 | United Kingdom . |
| 9425322 | 11/1994 | WIPO . |

*Primary Examiner*—Robert J. Oberleitner
*Assistant Examiner*—Devon Kramer
*Attorney, Agent, or Firm*—MacMillan, Sobanski & Todd, LLC

[57] ABSTRACT

In a braking system in which brake application is controlled electronically by the use of electrically controlled actuators (5, 6), a pedal-operated hydrostatic master cylinder (31) is connected to a brake (12) through at least one of the actuators (5). A first normally open valve (7) is provided so that upon failure of the electronic means (15a, 15b, 60), the value opens to permit hydrostatic pressure to apply both the front wheel brakes (1, 2) by putting them in fluidic communication. A second normally-open isolator valve (44) can be provided which is closed during normal brake operation to prevent hydrostatic pressure from being utilised to apply the brake, the valve opening automatically upon failure of the electronic means (15a, 15b, 60).

27 Claims, 2 Drawing Sheets

HYDRAULIC BRAKING SYSTEMS FOR VEHICLES

This invention relates to hydraulic braking systems for vehicles of the kind in which braking is provided under the control of electronic means by assessing a driver's braking demand electronically and by the use of an electrically controlled actuator, a brake pressure is applied to a wheel brake in proportion to the driver's demand.

In such a system it is preferable that a conventional supply of hydrostatic braking pressure is available to be switched into a brake line to actuate the brake if or when the electronic means fail or malfunction.

In one known hydraulic braking system, disclosed in DE-A1-3 424 912, braking is provided under the control of electronic means by assessing a driver's braking demand electronically and by the use of a first and second electrically controlled actuator associated with a respective first and second wheel brake. In the event of failure, brake pedal force can be "pushed-through" from the master cylinder to the wheel brakes. The pressure across the two brakes cannot, however, be balanced and is dependent upon the individual pressures applied by each actuator.

We are also aware of WO-A-94/25322 in which braking is provided by the use of an electrically controlled pressure source, wherein the braking system comprises a pedal operated master cylinder which is connected to a first brake through a single electrically controlled pressure source, and an isolator valve which permits fluid connection between the first front wheel brake and a second front wheel brake. In the event of failure, the isolator (or cutoff) valve is opened to allow pressure from the master cylinder to be applied to both wheel brakes. The master cylinder requires the provision of a separate brake line independent of the pressure source to provide the connection to the brakes.

According to our invention we provide an hydraulic braking system for vehicles in which braking is provided under the control of electronic means by assessing a driver's braking demand electronically and by the use of at least a first and a second electrically controlled actuator, said braking system comprising a pedal-operated hydrostatic master cylinder connected to a first front wheel brake for a first wheel through said first electrically controlled actuator and said second electrically controlled actuator is connected to a second brake for a different wheel, characterised by further comprising an isolator valve which permits fluid communication between said first front wheel brake and said second front wheel brake, and in that both first and second actuators comprise a piston working in a bore to pressurise fluid in a pressure space in advance of the bore, and in addition the first electrically controlled actuator only incorporates a normally open isolator valve which is closed during normal brake operation but which is otherwise open to define a first flow path through the first actuator and to the brake upon failure of the electronic means, and by said isolator valve being open in the event of failure of the electronic means to define a second flow path through which fluid from the first flow path can pass to apply the second front wheel brake independently of the operation of the second actuator and by flow through the pressure space in the second actuator.

Normally, when the electronic control means is operational the isolator valve is open so that the two front wheel brakes are mutually applied by both a first and second electrically controlled actuator. This establishes a balanced operating pressure across the axle of the vehicle despite any small inconsistencies in pressure supplied from either of the two electrically driven actuators.

Preferably, the first actuator incorporates a second normally open isolator valve which is closed during normal brake operation to isolate the brakes from the master cylinder. Upon failure of the electrical/electronic control, the second isolator valve is adapted to be open or remain open if electrical activation has not taken place, to allow communication between the driver applied master cylinder and both brakes on the controlled axle.

Thus the hydrostatic pressure is automatically switched in to continue the brake application following failure of the electronic means.

Conveniently, the electronic means may comprise an electric motor adapted to drive a piston forward in response to a control signal generated by a transducer which senses the force at the foot pedal and/or the displacement of the foot pedal and/or the pressure sensed at the output of the master cylinder.

The brake on each wheel of the vehicle can preferably be controlled by individual electrically-driven hydraulic actuators. Thus, the applied pressure may be adapted to be varied in accordance with any pre-determined or adaptively modified characteristics such as to take account of weight transfer, operating gradient, or even lateral and longitudinal acceleration/deceleration.

The displacement from the master cylinder can be accommodated in a supply space of the first electrically driven actuator. No such supply space need be provided in the actuator for the other front wheel brake since communication between itself and the master cylinder is effected through the first normally-open isolator valve and the normally-open valve of the first actuator, suitably of the centre valve type.

The pressure acting on the back of the piston of the first actuator can permit manual operation of the brakes in the event of electronic means failure even in the event that the normally-open valve of the first actuator is closed.

Should the brakes be applied by the electronically controlled brake system to such a level that causes a wheel to approach a skid, the first isolator valve is closed and anti-lock control can be achieved by modulation of each hydraulic actuator in accordance with control signals issued by an electronic controlled unit which, in turn, receives signals from force/pressure and displacement transducers, and wheel speed sensors.

By switching the first isolator valve to the closed position, the individual wheel brake pressures can be measured and controlled independently. During skid control, provision has to be made for the first actuator to allow the fluid accommodated from the master cylinder to be returned to the reservoir of the master cylinder as the differential piston of that actuator is modulated back and forth in the stepped bore. This is achieved by providing a three-port two-position solenoid-operated valve (3/2 valve) which is normally de-energised so as to allow communication between the master cylinder and the first hydraulic actuator and which is switched to connect the first hydraulic actuator to the reservoir of the master cylinder upon detection of a skid on at least the wheel being controlled by the said first actuator.

The principle advantage of the brake system of the present invention is that at any time should the electronically controlled system fail, the action of the driver depressing the pedal of the master cylinder will cause the master cylinder to generate hydraulic pressure which is fed to the brakes on the front wheel through the normally-open centre valve with in the differential piston and the normally-open isolating valve located between the front brakes. Therefore, without any further intervention by the electronically controlled braking system, or any associated sub-system, the pressure from the master cylinder can be pushed through to at least the brakes on the front axle of the vehicle.

This represents a significant advantage over a conventional electronically controlled braking systems in as much as no additional action is required to bring in the hydrostatic hydraulic back-up system. Braking on the front axle alone is more than sufficient to meet the majority of braking requirements since the braking capacity of the front axle is typically 80% of the total braking power.

In one construction, the electrically controlled first actuator comprises a differential piston working in a stepped bore in a housing and the supply space is defined in the bore between shoulders at steps in diameter is connected to the pedal-operated hydrostatic master cylinder, a normally-open valve controls communication between the pressure chamber in advance of the piston and the supply space, and for normal service operation the piston is driven electrically in a forward direction by electrical drive means, initially to cause the valve to close and thereafter to pressurise fluid in the pressure chamber to apply the brake.

In a modification, the master cylinder is connected to the pressure space of the first actuator from which it is isolated when the actuator for the front wheel brakes are operating normally, failure at the electronic means re-establishing communication between the master cylinder and both brakes through the open isolator valve.

In another combination the supply spaces of the actuators for both front wheel brakes are connected to the master cylinder, so that both brakes will be actuated by both actuators upon failure of the electronic means, and with the brake pressure equalized by automatic opening of the isolator valve.

Some embodiments of our invention are illustrated in the accompanying drawings in which.

Figure 1:
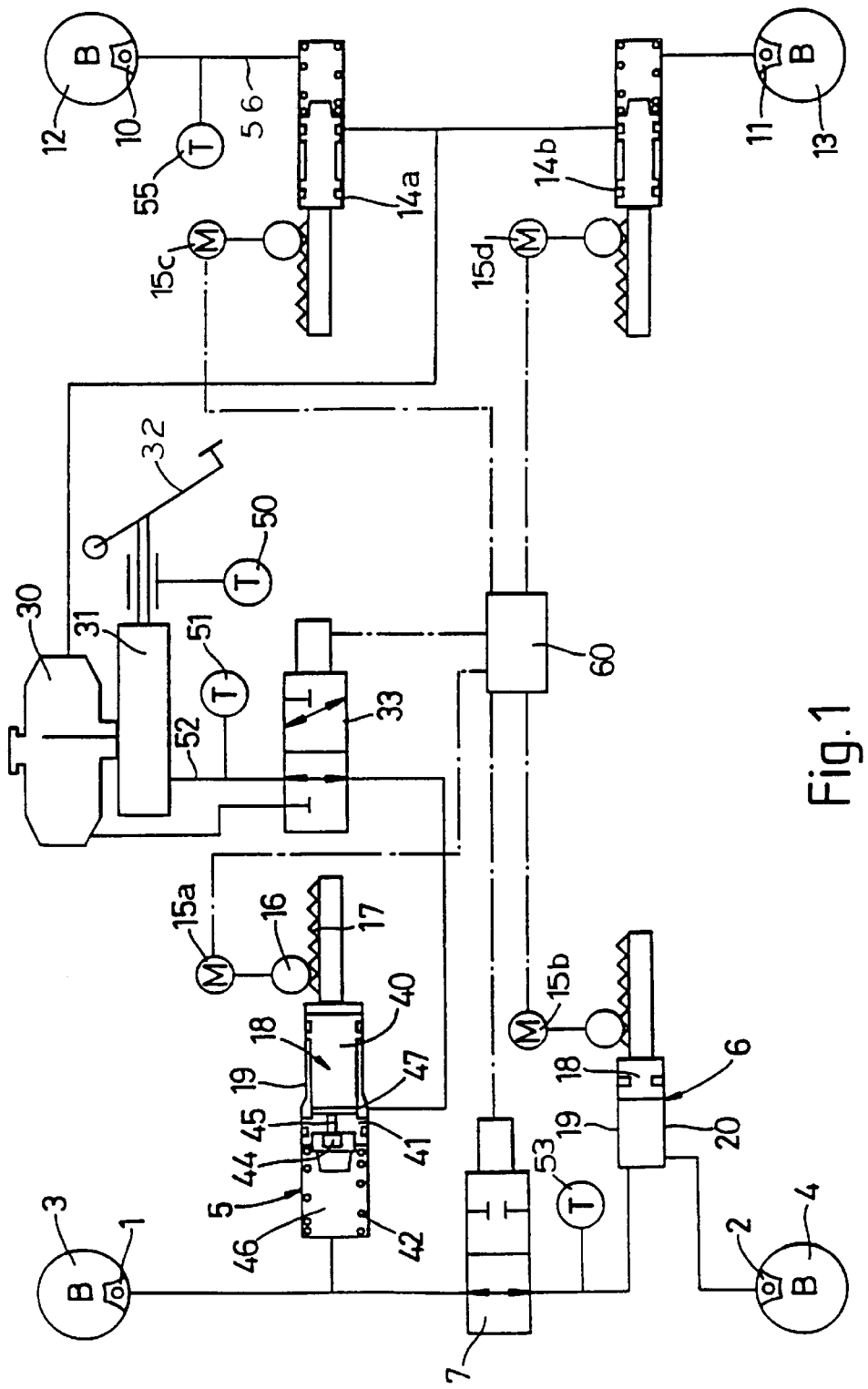
FIG. 1 is a layout of an electronically controlled hydraulic braking system for a vehicle.

In the braking system illustrated in the layout of FIG. 1 of the accompanying drawings brakes 1 and 2 on front wheels 3 and 4 of the vehicle are adapted to be applied by respective hydraulic actuators 5 and 6. The brakes are also interconnected by a normally-open solenoid-operated isolator valve 7.

Brakes 10 and 11 on rear wheels 12 and 13 are also adapted to be applied by means of individual hydraulic actuators 14.

Each hydraulic actuator may be of the same general type as forming the subject of our European Patent Application No. 0 395 262 in which an electric motor 15 drives a rotary pinion 16 meshing with a rack 17 in order to achieve linear movement of the rack and, in turn, to advance a brake applying piston 18 in a bore 19 in a housing 20. The actuators 14a and 14b for the brakes 10 and 11 on the rear wheels are supplied with fluid from a reservoir 30, in turn acting as a reservoir for a master cylinder 31 operated by a pedal 32.

A solenoid-operated valve 33 of the three-port two-position type controls communication between the reservoir 30 and the actuator 5, and between the master cylinder 31 and the actuator 5.

The first hydraulic actuator 5 comprises a piston in a bore. Specifically the piston 18 is of stepped outline comprising portions 40 and 41 of smaller and larger diameter which work in corresponding portions of the bore 19 which is also of stepped outline. A spring 42 acts on the piston 18 to urge it into a retracted position in which a cutoff valve preferably embodied as a center valve 44 mounted in the outer end of the piston 18 is open to permit free communication between the front brakes 1 and 2 and the reservoir 30 through passages 45 in the piston and the solenoid-operated valve 33.

A pressure chamber 46 is defined in the bore 19 in advance of the piston 18, and a supply chamber 47 is defined in the bore between the shoulders at steps in diameter of the bore and piston. This supply chamber 47 is connected to the pressure space of the master cylinder 31 through the solenoid-operated valve 33.

A transducer 50 measures the force applied to the pedal 32 and/or the displacement of the foot pedal, a transducer 51 measures the pressure in a line 52 between the master cylinder 31 and the solenoid-operated valve 33, a transducer 53 measures pressure in a supply line between the brakes 1 and 2 on the front wheels 3 and 4 of the vehicle, and a transducer 55 measures the pressure in a supply line 56 leading to the brakes from respective actuator 14.

An electronic control unit 60 receives signals from transducers 50, 51, 53, and 55, and from s peed sensors (not shown) which measure the behaviour of the wheels. According to the magnitude and duration of such signals the electronic control unit 60 emits an energizing current for operating the solenoid-operated controlled valves 7 and 33, and the motors (15a,15b,15c and 15d) in a manner to be described.

In the normal-off position of brakes illustrated in the drawings the four motors are de-energised as are the solenoid-operated valves 7 and 33 which are in such positions that the two front brakes 1 and 2 are in communication with each other, and the supply chamber 47 is in communication with the reservoir 30 through the master cylinder 31.

When the pedal 32 is operated the displacement is sensed by the transducer 50 and the electronic control unit 60 is operative to energize the motors (15a,15b,15c and 15d) to operate the actuator advancing the pistons 18 in the bores 19.

As the piston 18 of the first actuator is advanced in its bore the center valve 44 closes automatically to isolate the brakes 1 and 2 from the master cylinder 31, whereafter further movement of the piston 18 in the same direction pressurises fluid in the pressure space 46 to apply both front brakes 1 and 2.

The actual time at which the motors are energised is dependent on the amount of manual fill that is required should manual fill be provided for the system installation. As the displacement of the brake pedal (32) increases the electronic control unit 60 proportionally increases the control signal to each motor.

The displacement of fluid from the master cylinder is accommodated in the control space 47 of the first actuator 5.

The actual signal supplied to drive each motor may be different, this depending upon the specific controller regime and actuator configuration being employed, i.e. whether automatic compensations are being employed for controlling in accordance with weight transfer or adjusting for operating gradient.

In order to close the control loop, feedback signals are provided on each axle by pressure transducers (53,55) and from the master cylinder pressure line by a separate transducer 50.

The normally-open isolator valve 7 is switched to isolate the respective brakes on the front axle in all cases where independent pressure levels need to be set in each of said wheel brakes. Therefore, should the controller sense that a wheel is approaching a skid (ABS), or a wheel slip (TCS) or the need for lateral stability control (CDC), the isolator valve 7 is closed. With the isolator valve 7 in the closed position, independent pressure levels may be set in each brake by modulation of each rack 17 in accordance with signals from the electronic control unit 60.

In the case where this independent pressure level setting is required, it is necessary to boost and de-boost the pressure levels and hence fluid volumes in the actuators of the controlled wheel brakes. In the main actuator where there is a driver applied hydraulic pressure to the back of the main piston due to fluid in the supply chamber 47, the de-boosting can be conveniently achieved by switching the supply chamber to communicate with a low pressure reservoir such as the master cylinder reservoir.

The switching can be achieved through the use of a solenoid-operated valve 33. In the de-energised state, the valve permits normal communication between the master cylinder and the first actuator. In the energized state, for example during ABS, this valve isolates the master cylinder from the rest of the hydraulic system and allows the supply space of the first actuator to communicate with the master cylinder reservoir.

Should the electronic control system fail during a brake applying sequence the brakes 1 and 2 are applied automatically by the supply of hydrostatic pressure from the master cylinder 31 in the supply chamber 47 which acts over an area of the piston 18 equal to the difference between the areas of the two portions 41 and 42 to cause the piston 18 to be advanced further in the bore against the loading in the spring 42. Since the valve 7 opens automatically upon failure of the electronic control system it follows that both front wheel brakes 1 and 2 will be applied simultaneously.

The actuators on the rear axle are provided without hydraulic push-through, as in the failed case there would be little to gain by having manual braking of the rear brakes. Therefore, the motor driven actuators are provided with conventional AS sealing arrangements as generally known in the art of hydraulic master cylinders. As the brakes and actuators on the rear brakes are substantially similar, the single pressure transducer in one of the rear brake lines can be used to set the demand signal to the one of said motor actuators, and the other of said motor driven activators can be co-controlled from said drive signal.

Alternatively, independent control of both rear brakes can be achieved through the provision of an additional pressure transducer.

Figure 2:
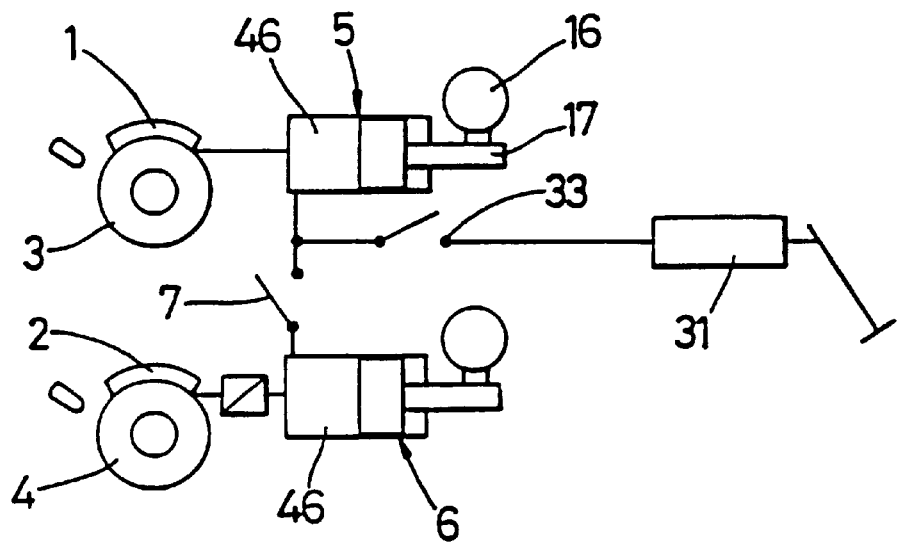
FIG. 2 is a modification of the layout of FIG. 1.

In the modified layout illustrated in FIG. 2 of the accompanying drawings the pressure spaces 46 of the two front wheel actuators are interconnected by the isolator valve 7, and the master cylinder is connected to the pressure space of the actuator 5 through the solenoid-operated valve 33.

In this construction, brake operation is initiated by the master cylinder, and pressure is supplied to both front brakes, say for ½ second, until the electronic means takes over control. At this point the two valves 7 and 33 close to place the pressure spaces 46 in communication, and isolate the master cylinder from the pressure spaces.

Upon failure of the electronic means, the two valves 7 and 33 are spring loaded into open position and pressure from the master cylinder 31 is applied to both front wheel brakes 1, 2 through both pressure spaces 46 by flow through the open valve 7.

Figure 3:
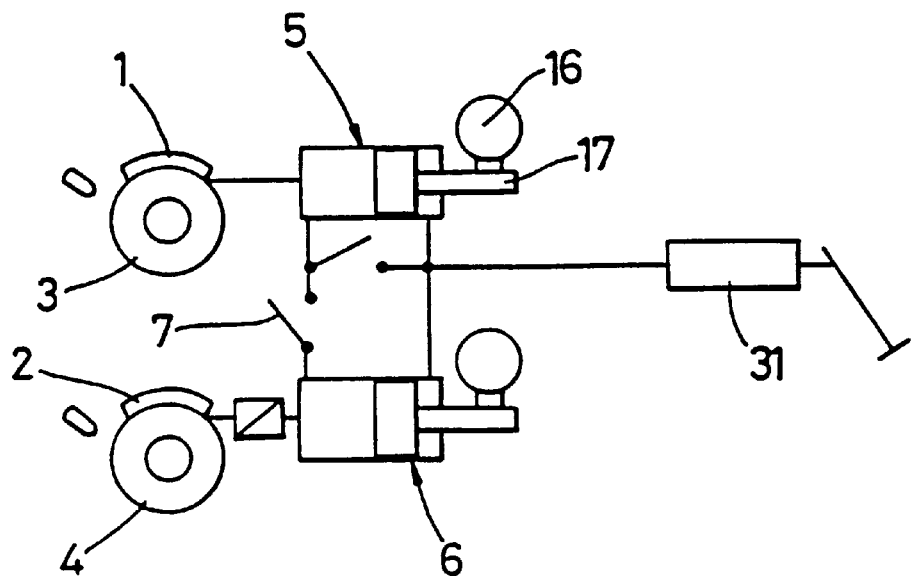
FIG. 3 shows yet a further modification.

In the construction shown in the layout of FIG. 3, both actuators 5 and 6 are of similar construction to the actuator 5 of FIG. 1. The master cylinder is connected at all times into the supply chambers 47 of both actuators 5 and 6.

This ensures that both brakes 1 and 2 can be applied upon failure of the electronic means, even though the isolator valve 7 may remain closed.

What is claimed is:

1. An hydraulic braking system for vehicles in which braking is provided under the control of electronic means by assessing a driver's braking demand electronically and by the use of at least a first and second electrically controlled actuator, said braking system comprising a pedal-operated hydrostatic master cylinder connected to a first front wheel brake for a first wheel through said first electrically controlled actuator, said second electrically controlled actuator is connected to a second front wheel brake for a different wheel, a first isolator valve adapted to permit fluid communication between said first front wheel brake and said second front wheel brake, where in both said first and second actuators comprise a piston working in a bore to pressurize fluid in a pressure chamber, and said the first electrically controlled actuator only incorporates a normally open second isolator valve which is closed during normal brake operation but which is otherwise open to define a first flow path through said first actuator and to said brake up on failure of said electronic means, and by said first isolator valve being open in the event of failure of said electronic means to define a second flow path through which fluid from said first flow path can pass to apply said second front wheel brake independently of operation of said second actuator and by flow through said pressure chamber in said second actuator.

2. An hydraulic braking system as claimed in claim 1, wherein said first isolator valve is open during normal braking to permit the brakes on both front wheels to be mutually applied by said first and said second electrically controlled actuators.

3. An hydraulic braking system as claimed in claim 1, wherein said first isolator valve can be closed to isolate said two front wheel brakes from each other, the said two brakes being applied independently by said first and said second actuators.

4. An hydraulic braking system as claimed in claim 1, wherein said electronic means comprises an electric motor associated with a respective electrically controlled actuator and adapted to drive a piston of said respective electrically controlled actuator forward in response to a control signal generated by at least one of a transducer which senses force exerted on the foot pedal by a driver, a transducer which senses the displacement of the foot pedal, and a transducer which senses the pressure sensed at the output of the master cylinder.

5. An hydraulic braking system as claimed in claim 1, wherein said braking system further comprises brakes for each of the other wheels of the vehicle, each said further brake being controlled by an individual electrically-driven hydraulic actuator so that the applied pressure is adapted to be varied in accordance with at least one of a pre-determined characteristic and an adaptively modified characteristic, such as to take account of at least one of weight transfer, operating gradient, lateral acceleration, lateral deceleration, longitudinal acceleration and longitudinal deceleration.

6. An hydraulic braking system according to claim 1, wherein, anti-lock control can be achieved by modulation of one or more of said electrically controlled actuators in accordance with control signals issued by an electronic control unit.

7. An hydraulic braking system according to claim 6, wherein said electronic control unit receives signals from at least one of force transducers, wheel speed sensors, the displacement of the foot pedal, and the pressure sensed at the output of the master cylinder.

8. An hydraulic braking system according to claim 1, wherein said first electrically controlled actuator comprises a differential piston defining a stepped outline and working in a stepped bore in a housing, a supply space is defined in the bore between shoulders at the steps in diameter of the stepped bore and the stepped differential piston, and said normally-open isolator valve controls communication between the pressure chamber in advance of the piston space and the supply space.

9. An hydraulic braking system according to claim 8, wherein said normally open valve is of the center valve type.

10. An hydraulic braking system according to claim 8, wherein said fluid displacement from the master cylinder is accommodated in said supply space of the first electrically driven actuator such that in normal service operation the piston is driven electrically in a forward direction by electrical drive means, initially to cause said normally-open valve to close and thereafter to pressurize fluid in said pressure chamber to apply the brake.

11. An hydraulic braking system according to claim 10, wherein said master cylinder is connected to the supply space of said first actuator through a third isolator valve.

12. An hydraulic braking system according to claim 11, wherein said third isolator valve comprises a three-port two-position solenoid-operated valve which is normally de-energized so as to allow communication between the master cylinder and the first electrically driven actuator and which is switched to connect the first electrically driven actuator to the reservoir of the master cylinder upon detection of a skid on at least the wheel being controlled by said first actuator.

13. An hydraulic braking system according to claim 2, wherein said pressure chambers of said actuators for both front wheel brakes are connected through said first isolator valve, so that both brakes will be actuated by pressure from the master cylinder upon failure of the electronic means, and with the brake pressure equalized by automatic opening of said first isolator valve.

14. An hydraulic braking system for vehicles, comprising:
   a sensor generating a signal indicative of a driver's braking demand;
   an electronic control unit receiving said signal;
   a first wheel brake for a first wheel of a vehicle;
   a second wheel brake for a second wheel of a vehicle;
   an isolator valve operating between open and closed positions under the control of said electronic control unit, said isolator valve being in fluid communication with said first and second wheel brakes to permit fluid communication between said first wheel brake and said second wheel brake when said isolator valve is open, said isolator valve being open in the event of electrical failure to define a flow path between said first wheel brake and said second wheel brake;
   a first hydraulic actuator electrically controlled by said electronic control unit for supplying pressurized hydraulic fluid to said first wheel brake, said first hydraulic actuator incorporating a normally open cutoff valve which is closed during normal brake operation but which is otherwise open to define a first flow path through said first actuator;
   a brake pedal;
   a hydrostatic master cylinder operated by said brake pedal and connected to said first wheel brake for a first wheel via said first flow path through said cutoff valve in said first electrically controlled actuator; and
   a second hydraulic actuator electrically controlled by said electronic control unit for supplying pressurized hydraulic fluid to said second wheel brake, said second hydraulic actuator being in fluid communication only with said isolator valve and said second wheel brake.

15. An hydraulic braking system as claimed in claim 14, wherein said isolator valve is open during normal braking to permit the brakes on both said first wheel and said second wheel to be mutually applied by said first and said second actuators.

16. An hydraulic braking system as claimed in claim 14, wherein said isolator valve can be closed to isolate said two wheel brakes from each other, the said two brakes being applied independently by said first and second actuators.

17. An hydraulic braking system as claimed in claim 14, wherein each of said first and second actuators comprise an associated electric motor under the control of said electronic control unit, which motor is adapted to drive an associated piston forward in response to said signal.

18. An hydraulic braking system as claimed in claim 14, wherein said braking system further comprises brakes for each of the other wheels of the vehicle, each said further brake being controlled by an individual electrically-driven hydraulic actuator so that the applied pressure is adapted to be varied in accordance with at least one of a pre-determined characteristic and an adaptively modified characteristic, such as to take account of at least one of weight transfer, operating gradient, lateral acceleration, lateral deceleration, longitudinal acceleration and longitudinal deceleration.

19. An hydraulic braking system according to claim 14, wherein anti-lock control can be achieved by modulation of one or more of said electrically controlled actuators in accordance with control signals issued by said electronic control unit.

20. An hydraulic braking system according to claim 19, wherein said electronic control unit receives signals from at least one of a force transducer, a wheel speed sensor, a sensor sensing displacement of said brake pedal, and a sensor sensing the pressure sensed at the output of said master cylinder.

21. An hydraulic braking system according to claim 14, wherein said first actuator comprises a piston defining a first end having first diameter and a second end having a second diameter different from said first diameter and defining a piston shoulder between said first and second ends, said piston working in a stepped bore in a housing, said housing said bore including a pressure chamber selectively acted upon by said piston to pressurize hydraulic fluid in said pressure chamber, defining a shoulder in said stepped bore, a supply space being defined in said bore between said shoulder and said piston shoulder, said normally-open cutoff valve controlling communication between said pressure chamber and said supply space.

22. An hydraulic braking system according to claim 21, wherein said normally open cutoff valve is of the center valve type.

23. An hydraulic braking system according to claim 21, wherein fluid displaced from said master cylinder when said brake pedal is depressed is accommodated in said supply space of said first actuator such that in normal service operation said piston of said first actuator is driven electrically in a forward direction by an electrical drive, initially to cause said normally-open cutoff valve to close and thereafter to pressurize fluid in said pressure chamber in advance of said piston to apply said first wheel brake.

24. An hydraulic braking system according to claim 23, wherein said master cylinder is connected to said supply space of said first actuator through a second isolator valve.

25. An hydraulic braking system according to claim 24, wherein said second isolator valve comprises a three-port two-position solenoid-operated valve which is normally de-energized so as to allow communication between said master cylinder and said first actuator and which is switched to connect said first actuator to a reservoir of said master cylinder upon detection of a skid on at least said first wheel being controlled by said first actuator.

26. An hydraulic braking system according to claim 15, wherein both said first and second wheel brakes are front wheel brakes of said vehicle and said actuators for both said first and second wheel brakes are connected through the isolator valve, so that both brakes will be actuated by pressure from the master cylinder upon failure of the electronic means, and with the brake pressure equalized by automatic opening of the isolator valve.

27. An hydraulic braking system for vehicles in which braking is provided under the control of electronic means by assessing a driver's braking demand electronically, comprising:

a first electrically controlled actuator comprising a piston working in a bore to pressurize fluid in a pressure space in advance of the piston connected to a first front wheel brake for a first wheel;

a second electrically controlled actuator connected to a second front wheel brake for a second wheel comprising a second piston working in a second bore to pressurize fluid in a second pressure space in advance of the second piston, only said second electrically controlled actuator incorporating a normally open cut-off valve which is closed during normal brake operation but which is otherwise open to define a first flow path through said second actuator; and a pedal-operated hydrostatic master cylinder connected via said first flow path through said second electrically controlled actuator to said second wheel brake;

an isolator valve adapted to permit fluid communication between said first front wheel brake and said second front wheel brake, said isolator valve being open in the event of electrical failure to define a second flow path through which fluid from said first flow path can pass to apply said second wheel brake independently of operation of said second actuator and by flow through said pressure space in said second actuator.

* * * * *

UNITED STATES PATENT AND TRADEMARK OFFICE
CERTIFICATE OF CORRECTION

PATENT NO. : 6,099,087
DATED : August 8, 2000
INVENTOR(S) : Ivan Mortimer, Helmut Heibel It is certified that error appears in the above-identified patent and that said Letters Patent is hereby corrected as shown below:

Column 6,
Line 13, delete "where in" and insert -- wherein --.
Line 21, delete "up on" and inset -- upon --.

Column 8,
Line 6, after "in a housing," delete "said housing";
Line 9, after "chamber," insert -- said housing --.

Column 10,
Line 26, after "second" insert -- front --"

Signed and Sealed this

Fourteenth Day of August, 2001

*Attest:*

NICHOLAS P. GODICI
*Attesting Officer*  Acting Director of the United States Patent and Trademark Office